(12) United States Patent
Haagenson

(10) Patent No.: US 8,312,911 B2
(45) Date of Patent: Nov. 20, 2012

(54) GOLF CART CURTAIN ASSEMBLY

(76) Inventor: Maurice S Haagenson, Troutdale, OR (US)

( * ) Notice: Subject to any disclaimer, the term of this patent is extended or adjusted under 35 U.S.C. 154(b) by 48 days.

(21) Appl. No.: 13/077,903

(22) Filed: Mar. 31, 2011

(65) Prior Publication Data

US 2011/0174448 A1 Jul. 21, 2011

Related U.S. Application Data

(63) Continuation-in-part of application No. 12/387,271, filed on Apr. 29, 2009, now abandoned.

(51) Int. Cl.
*A47H 1/00* (2006.01)
*B62D 25/06* (2006.01)

(52) U.S. Cl. ........................................ 160/330; 296/138

(58) Field of Classification Search .................. 160/123, 160/330, 350, 368.1, DIG. 2; 296/138, 77.1, 296/83
See application file for complete search history.

(56) References Cited

U.S. PATENT DOCUMENTS

| | | | | |
|---|---|---|---|---|
| 1,428,972 A * | 9/1922 | Newell | ........................... | 248/262 |
| 5,921,609 A * | 7/1999 | Mills et al. | ..................... | 296/138 |
| 6,044,891 A * | 4/2000 | Guo | .......................... | 160/370.21 |
| 6,926,334 B1 * | 8/2005 | Diehm | ........................... | 296/83 |
| 2002/0145302 A1 * | 10/2002 | Winkler | ....................... | 296/77.1 |
| 2004/0007894 A1 * | 1/2004 | Hamm | ............................. | 296/79 |
| 2009/0140539 A1 * | 6/2009 | Jones et al. | .................. | 296/77.1 |

* cited by examiner

*Primary Examiner* — Katherine w Mitchell
*Assistant Examiner* — Jeremy Ramsey
(74) *Attorney, Agent, or Firm* — Mark S. Hubert

(57) ABSTRACT

A portable golf cart curtain assembly that is able to be installed by one golfer in a matter of minutes on any golf cart and provide a substantial barrier to the elements. Its extensible framework is designed for quick attachment to a plethora of different carts and to remain in place despite the twisting of the golf cart frame and any jostling of the golf cart as it traverses about the course. A set of rubber grommets keeps any movement of the assembly quiet as metal on metal contact is eliminated.

10 Claims, 10 Drawing Sheets

GOLF CART CURTAIN ASSEMBLY

This application is being filed under 37 CFR 1.53(b) as a continuation in part of U.S. patent application Ser. No. 12/387,271 filed on Apr. 29, 2009 entitled "Golf Cart Side Curtain Assembly" and incorporates by reference and claims the benefit of the prior nonprovisional application under 35 U.S.C. 120.

BACKGROUND OF THE INVENTION

The present invention relates to an extremely versatile portable curtain system for a golf cart (or similarly sized utility vehicle) that is adapted to provide protection from the outside elements and ease of installation for the user. More particularly, to a universal golf cart curtain assembly that is quiet and is designed to stay in place despite the twisting of the golf cart frame as it traverses over a golf course terrain.

Ardent golfers shoot a round of golf despite the wind and rain. Additionally, most ardent golfers own their own golf carts or rent a golf cart each time they shoot a round of golf. One way to mitigate the elements while on the course is to enclose the golf cart sides and back with fabric curtains. These curtains have special requirements in that they will receive little attention. They must be mildew proof, waterproof, strong enough to withstand a direct hit from a golfball, partially transparent, rigid enough to prevent being blown into the cart in a cross breeze and designed so as to allow quick access and entry. The ability for quick attachment and removal with as little modification to the cart as possible is also a desirable attribute.

Conventional curtains have been available on golf carts for years, however generally they zipper, snap or hook and loop fasten to close and/or attach to the golf cart. This is time consuming and frustrating at best for the user and requires modifications to the golf cart. Generally, a curtain set fit to one golf cart wont work on an identical golf cart because of the close tolerances for the grommet or snap fastener placement cant be matched. Additionally, the present golf cart curtains on the market now are very bulky which makes them problematic to take home when they are wet. Hence the reason for such lackluster sales and poor market presence.

It is cost effective for a fleet of golf carts to only have about half of their carts curtained and have a method of quickly moving the curtains to the other half based on equalizing the remaining battery life of the carts.

Henceforth, a universal golf cart side curtain that could quickly be installed on a rented golf cart would fulfill a long felt need in the golf industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a portable, universal golf cart curtain that is able to be installed by one golfer in a matter of minutes on any golf cart and provide a substantial barrier to the elements.

It has many of the advantages mentioned heretofore and many novel features that result in a new golf cart curtain assembly which is not anticipated, rendered obvious, suggested, or even implied by any of the prior art, either alone or in any combination thereof.

In accordance with the invention, an object of the present invention is to provide an improved golf cart curtain assembly that is portable and easily transportable.

It is another object of this invention to provide an improved golf cart curtain assembly capable of protecting the passengers in a golf cart from stray golf balls.

It is a further object of this invention to provide an improved golf cart curtain assembly that can be quickly installed on any golf cart and does not impede the driver's visibility.

It is still a further object of this invention to provide for an improved golf cart curtain assembly that can easily be opened and closed and is not susceptible to being blown into the cabin of the golf cart.

It is yet a further object of this invention to provide improved golf cart curtain assembly that is waterproof and resists mold and mildew accumulation as well as damage from golf balls.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
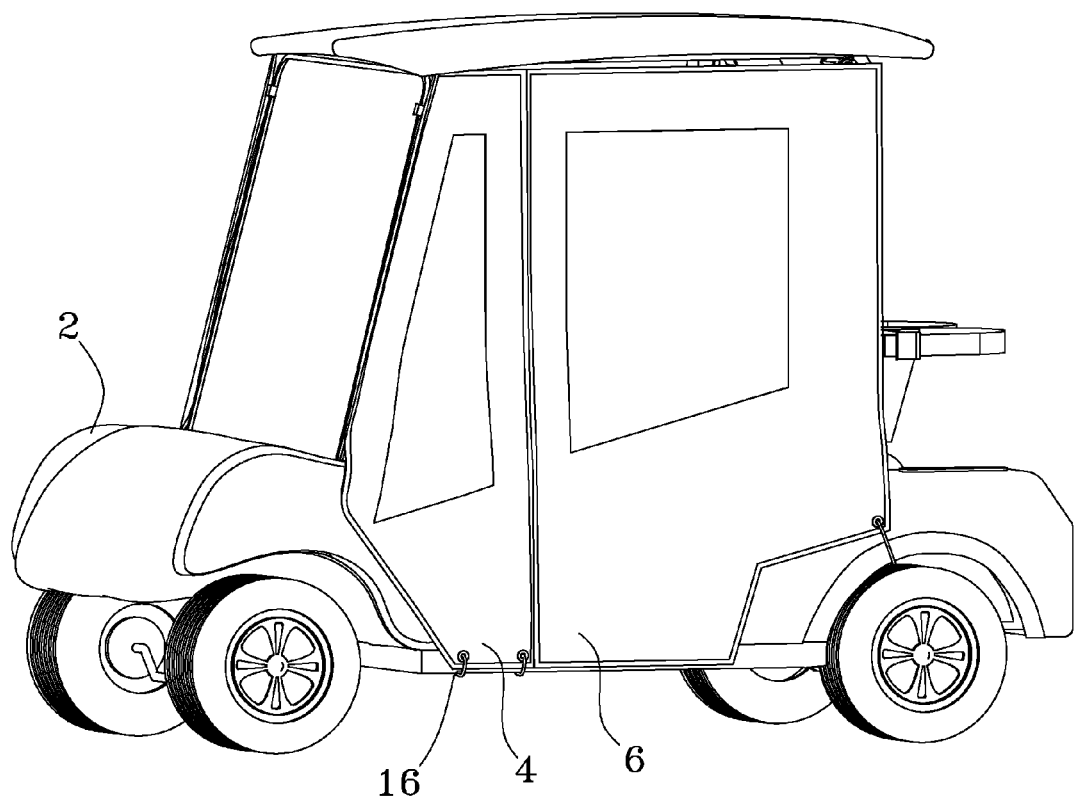
FIG. 1 is an exterior front perspective view of a golf cart with the curtain.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto. The golf cart curtain apparatus that is described in detail below, is easy to transport as well as remove and install by one person, on any golf cart. It is also mildew and mold resistant, waterproof and windproof.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Of primary concern in this invention is the ability for a set of curtains to be quickly installed on a plethora of different manufacture's models of golf carts without the use of any permanently fastenable hardware such as grommets, dome snap fasteners, toggle bolts, or any mechanical fastener requiring the drilling of a hole into the golf cart assembly.

Figure 15:
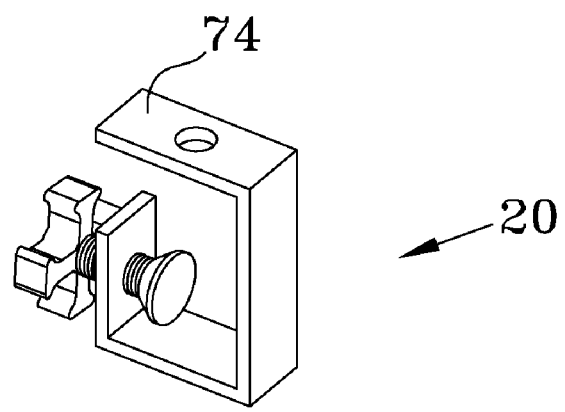
FIG. 15 is a side perspective view of a back curtain frame support roof clip.

Looking at exterior views of the golf cart 2 in FIGS. 1 to 5, the various components of the improved golf cart curtain assembly can best be seen. The curtain assembly is made of a pair of side front curtains 4, a pair of side rear curtains 6, a rear curtain 8, an adjustable rear curtain support frame 10, four curtain rod support brackets 12, two telescopically adjustable curtain rods 14, six side curtain extendable frame attachment clips 16, two adjustable rear curtain support frame attachment arms 18 and at least one rear curtain support frame roof clip 20. (FIG. 15) The system is adapted to be removably and quickly attached to a golf cart without any permanent alteration to the golf cart 2.

Figure 6:
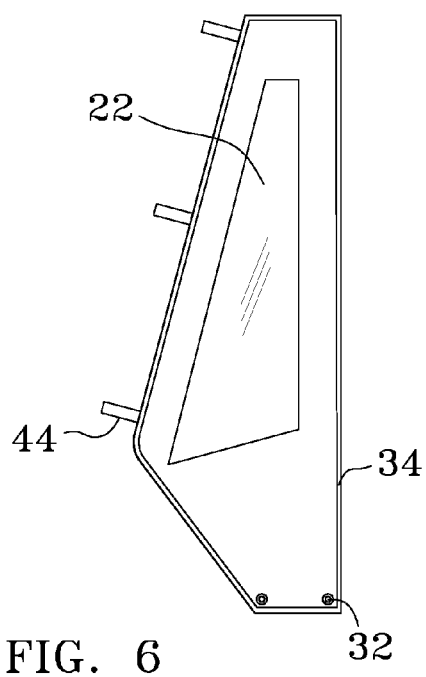
FIG. 6 is an outside view of the front side curtain.
Figure 7:
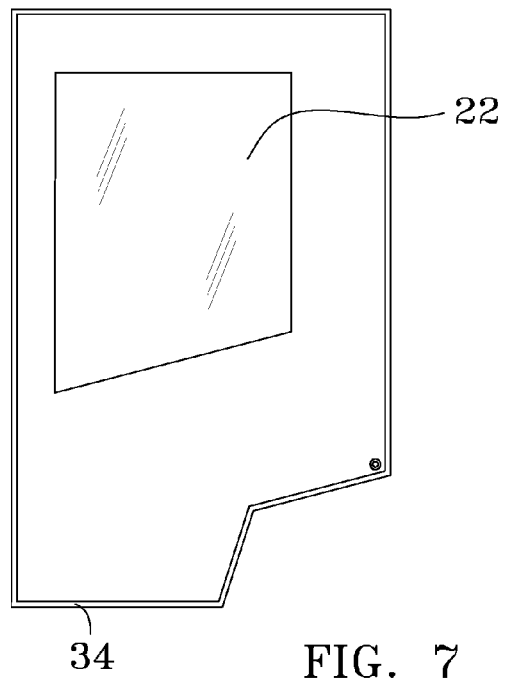
FIG. 7 is an outside view of the back side curtain.
Figure 8:
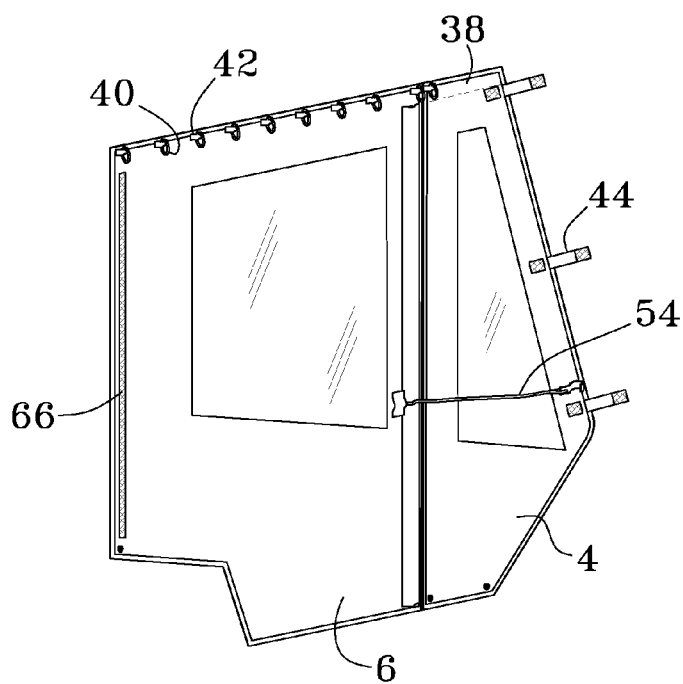
FIG. 8 is an inside view of front side curtain and the back side curtain combined.
Figure 16:
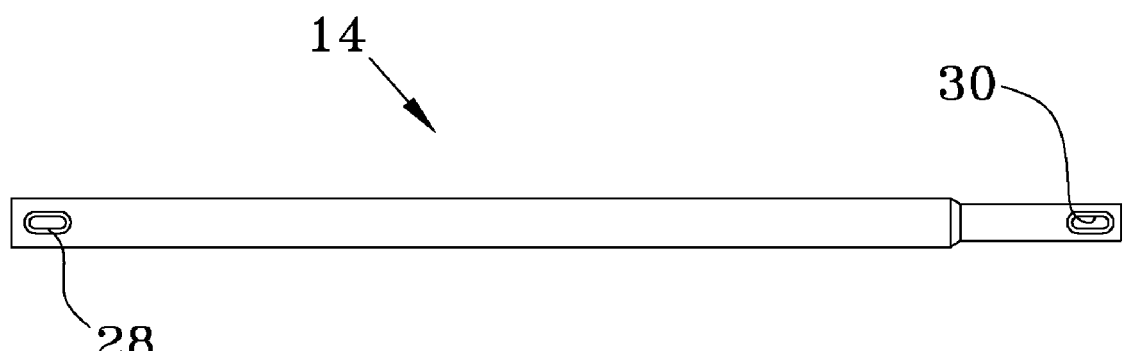
FIG. 16 is a side view of the side curtain rod.

Looking at FIGS. 6, 7 and 8 it can best be seen that in operation the side front curtains 4 and side rear curtains 6 are made of a waterproof flexible cloth with the peripheral edges 34 stitch hemmed back onto the body of the curtain. Preferably the curtain material is treated so as to prevent mildew and mold from forming on it surfaces. A transparent plastic window 22 is constrained into a central cutout in all of the curtains. The side front curtain 4 and the side rear curtain 6 have at least one grommet 32 located adjacent a bottom edge. Through these grommets 32 pass side curtain extendable frame attachment clips 16. These are elastic cords with a rigid hook affixed to one end for connecting to the underside of the golf cart on its frame. On the other end is a stop device that is too large to pass through the grommets. The side curtain extendable frame attachment clips 16 are tensionably stretched from the bottom of the side curtains to the cart's rear frame to hold the side curtains 4 and 6 movably taut in the vertical direction between the curtain rod 14 and the cart floor. This prevents the side curtains curtain 4 and 6 from being blown onto or sucked onto the driver and passengers, prevents a stray golf ball from transferring its energy through the curtain to the passengers, and allows the curtains to hang in a generally planar fashion rather than wrinkled so as to better shed rain. Both the side curtains 4 and 6 are suspended in some manner from a telescoping curtain rod 14 (FIG. 16). The flexible method of tensioning the side curtains in the vertical direction prevents the inadvertent release of the curtain from a non deformable curtain to frame attachment mechanism such as a snap fastener, hook and loop fastener or a stud and grommet fastener. This commonly occurs as a cart traverses rough terrain and the frame and roof twist with respect to each other, causing damage to the curtain.

Figure 17:
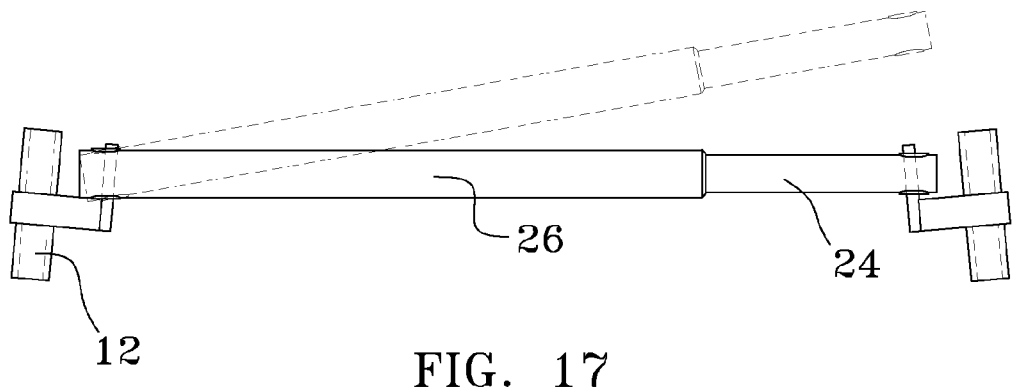
FIG. 17 is an installation view for the side curtain rod.
Figure 18:
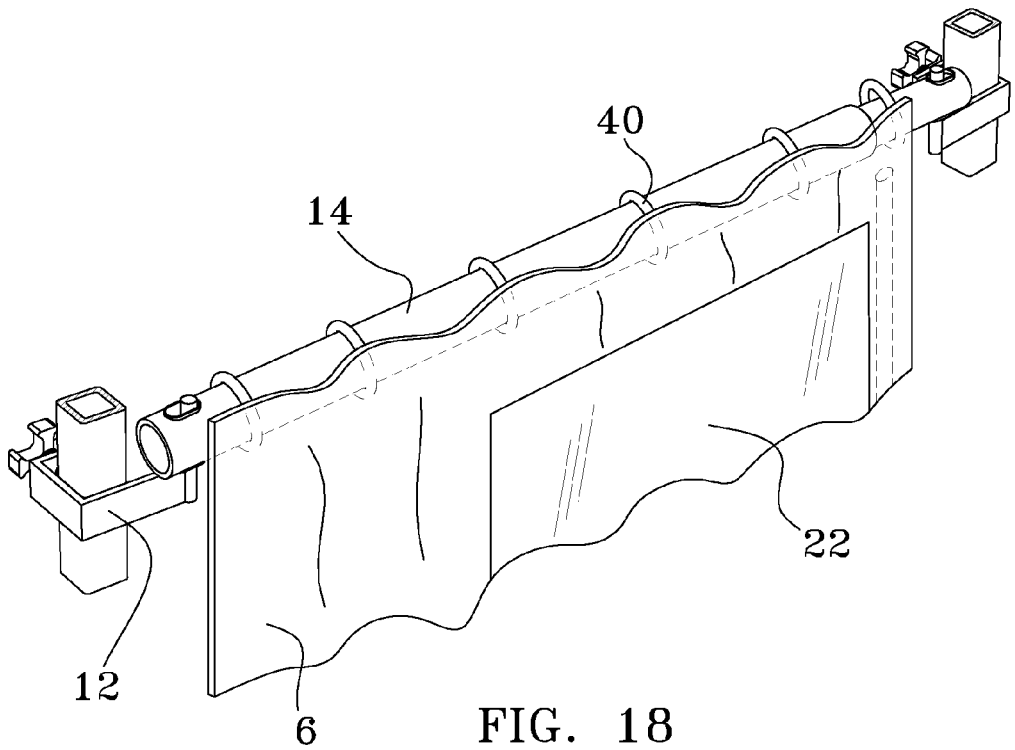
FIG. 18 is a cutaway side perspective view of the rear side curtain installed on the side curtain rod.

Looking at FIGS. 16, 17 and 18 the telescoping curtain rod 14 can best be seen. Basically the curtain rod 14 is made of a first section of tubing 24 that is slide inside a second, larger section of tubing 26 with a suitable clearance between the OD of the first section of tubing and the ID of the second section of tubing so as to minimize slop yet allow smooth sliding engagement between the two. This sliding engagement allows the curtain rod 14 to lengthen and shorten as need be. The round nature of the curtain rod tubing allows for twisting motions of the two sections relative to each other as is encountered when the cart roof stanchions (pillars) are jostled in travel and the golf cart frame twists. There are also substantial length and angle differences between the pillars on the various types of golf carts and this telescoping rod 14 allows the side curtain assembly to generically fit all golf carts. The distal and proximate ends of the curtain rod 14 each have oblong orifices 28 cut therethrough their tubing that reside along the linear axis of the tubing. A polymer bushing 30 is fit about the interior of these oblong orifices 28. This bushing 30 helps to frictionally engage the curtain rod support brackets 12 as well as silence any metal to metal contact that occurs between the peg 28 and the curtain rod 14 as the golf cart jostles about. Since the roof stanchions generally don't reside parallel to each other the curtain rod support brackets 12 may not be able to be frictionally affixed to the stanchions so as to be parallel to each other, hence the need for an oblong orifice 28. Testing has shown that with this configuration the curtain rod 14 is less likely to jump off of the curtain rod support brackets 12 when the cart goes over rough terrain.

As mentioned earlier, the side front curtains 4 and side rear curtains 6 are each attached to the curtain rod 14 in a different fashion. The side front curtain 4 has an upper loop 38 stitched along its top edge through which the curtain rod 14 is threaded so as to allow sliding engagement. In the case of the side rear curtain, fabric loops 42 are stitched about the upper hem so as to constrain rings 40 although other ring retention means may be used such as hook and loop fasteners, dome fasteners or zig zag stitching. The rings 40 are of a resilient, non rusting material such as stainless steel, brass, or a polymer that slidingly and quietly engage the telescoping curtain rod 14 in a slideable manner.

The side front curtain 4 has a series of stanchion ties 44 made of a hook and loop fastener design that wrap around the front roof stanchion to hold the side front curtain taut in a horizontal direction yet will yield and open so as not to damage the side front curtain 4 if the cart frame twists and the curtain is pulled excessively taut.

FIGS. 12, 14, 17 and 18 show the curtain rod support brackets 12. These brackets affix to either the front and rear roof stanchions or the front roof stanchion and the adjustable rear curtain support frame 10. They frictionally engage the outer surface of the roof stanchion/support frame through the use of a "U" shaped friction clamp 46 and a tightenable mechanical fastener 52, such that when attached will position a spacer arm 48 that supports an affixed planar curtain rod support plate 50 in a vertical orientation. This curtain rod support plate 50 passes through the bushings 30 of the curtain rod 14 to support the weight of the side curtains, holding them taut. Although the tightenable mechanical fastener is depicted as a threaded bolt with and without a tightening knob thereon, it is known that there are a plethora of mechanical fasteners that would accomplish the same result such as a pivotable toggle clamp arm. Although not shown, there are optional polymer, non marking semi compressible, gripable pads that may be affixed to the inside of the friction clap portion of the curtain rod support brackets 12 to prevent scratching the golf cart stanchions and to prevent the movement of these brackets 12. It is well known in the industry that other means of compression may be used in conjunction with the curtain rod support 30 such as circular clamps, buckle clamps and the like. Also, although it has been shown that a planar configuration for the curtain rod support plate 50 is best suited for retention of the curtain rod 14 as the golf cart 2 jostles and the frame twists during operation, it is known that different configurations of the plate 50 would be easily designed.

While there are slight differences in the dimensions of the side openings of the different golf carts, they are relatively small such that the same side front curtain 4 and the side rear curtain 6 will accommodate all carts. Looking at FIG. 8 it can be seen that there is an elastic cord 54 affixed at its proximate end to the front of the side rear curtain 6 and that has a hook affixed to its distal end that may be hooked about the front roof stanchion so as to draw the two curtains tightly together. Any additional side rear curtain will partially overlap onto the side front curtain.

Figure 2:
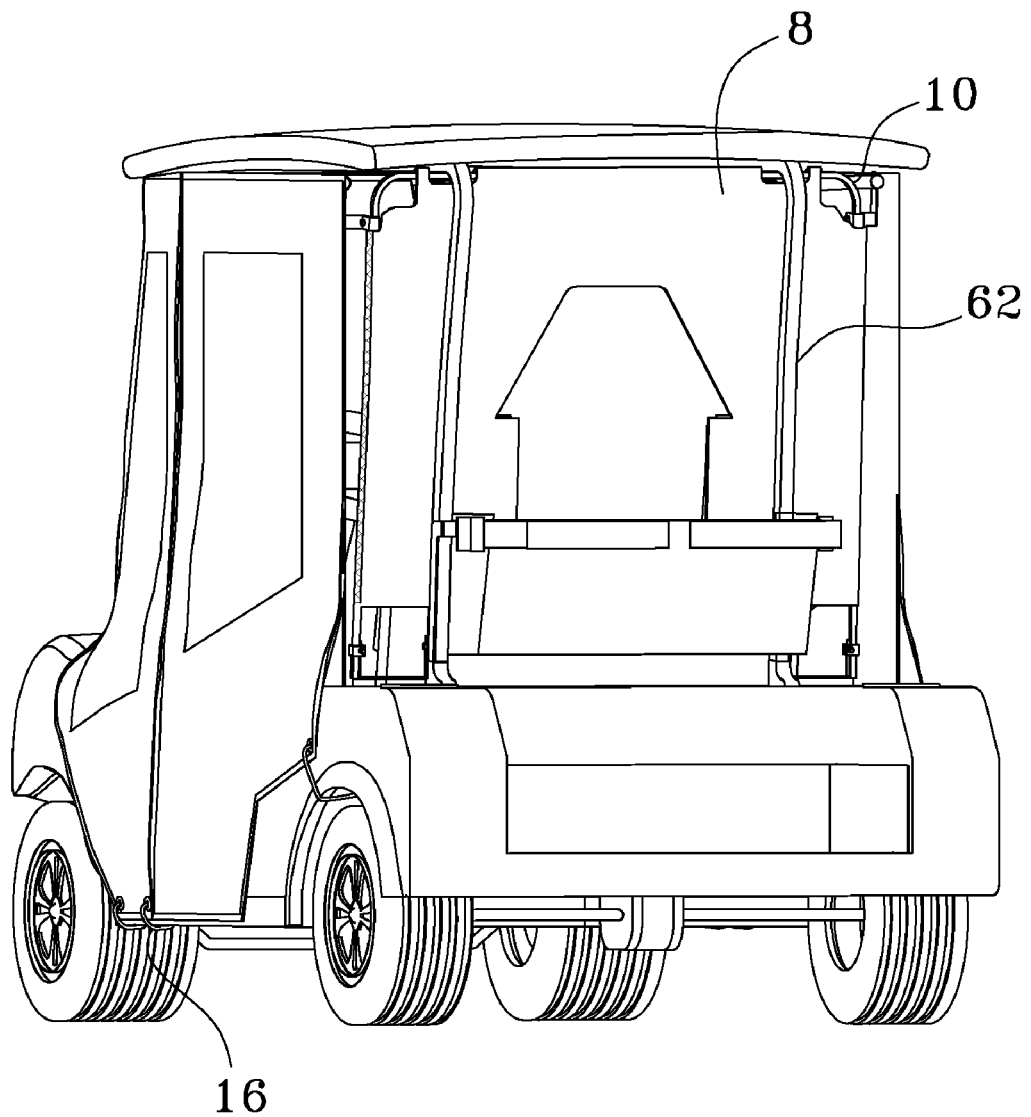
FIG. 2 is an exterior back perspective view of a golf cart with the curtain.
Figure 3:
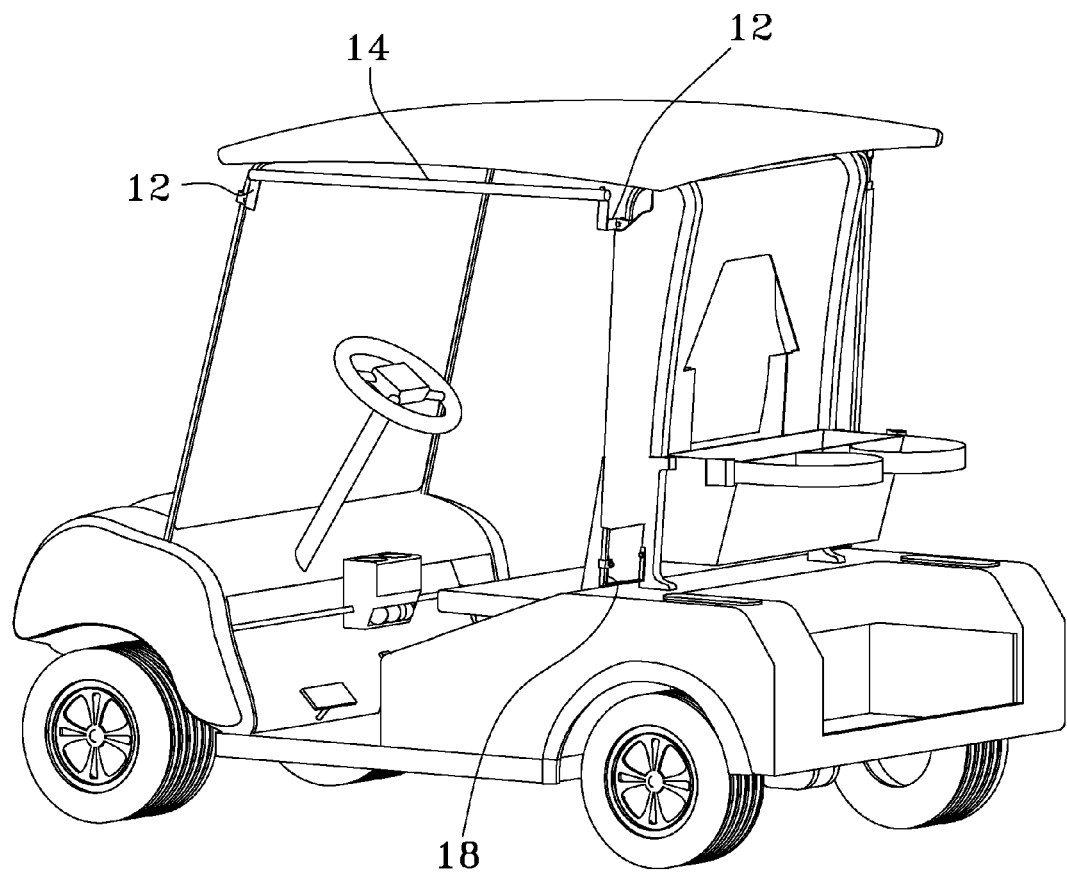
FIG. 3 is a side perspective view of a golf cart with the side curtain rod and rear curtain installed.
Figure 4:
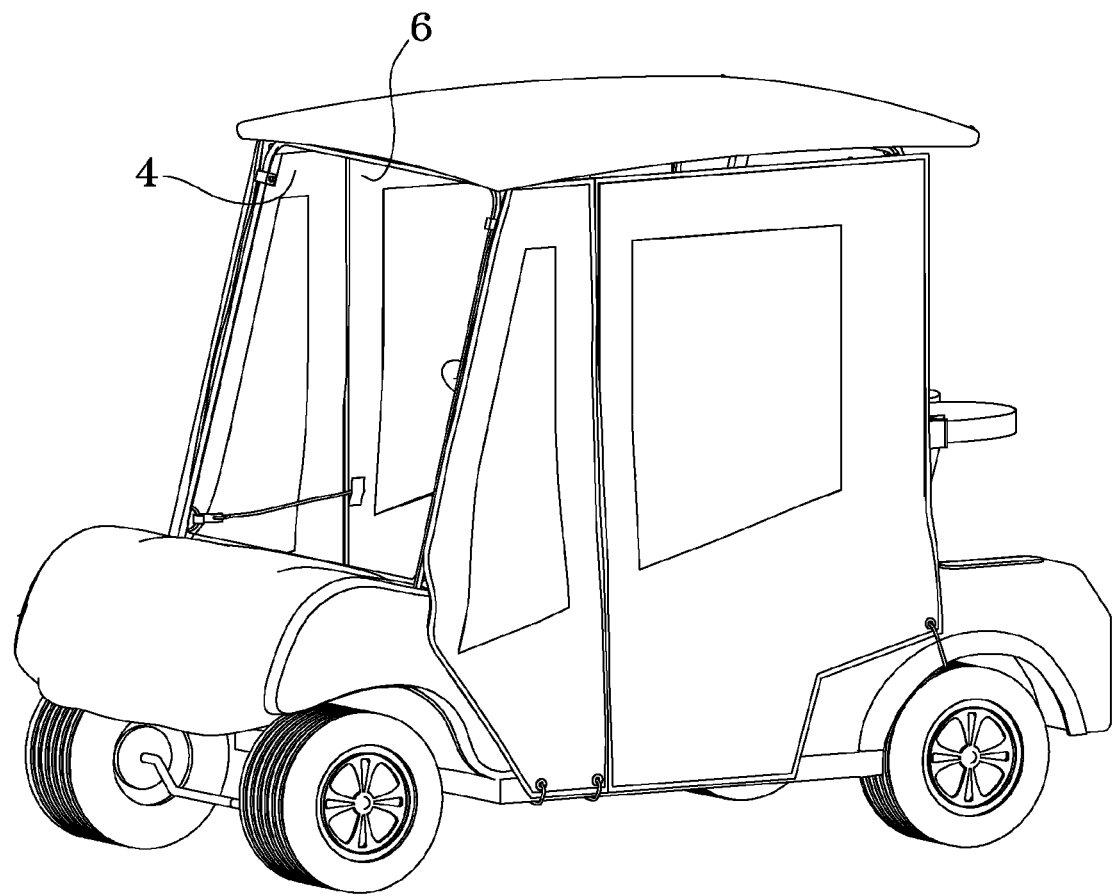
FIG. 4 is an exterior side perspective view of the interior attachments of the side curtain.
Figure 5:
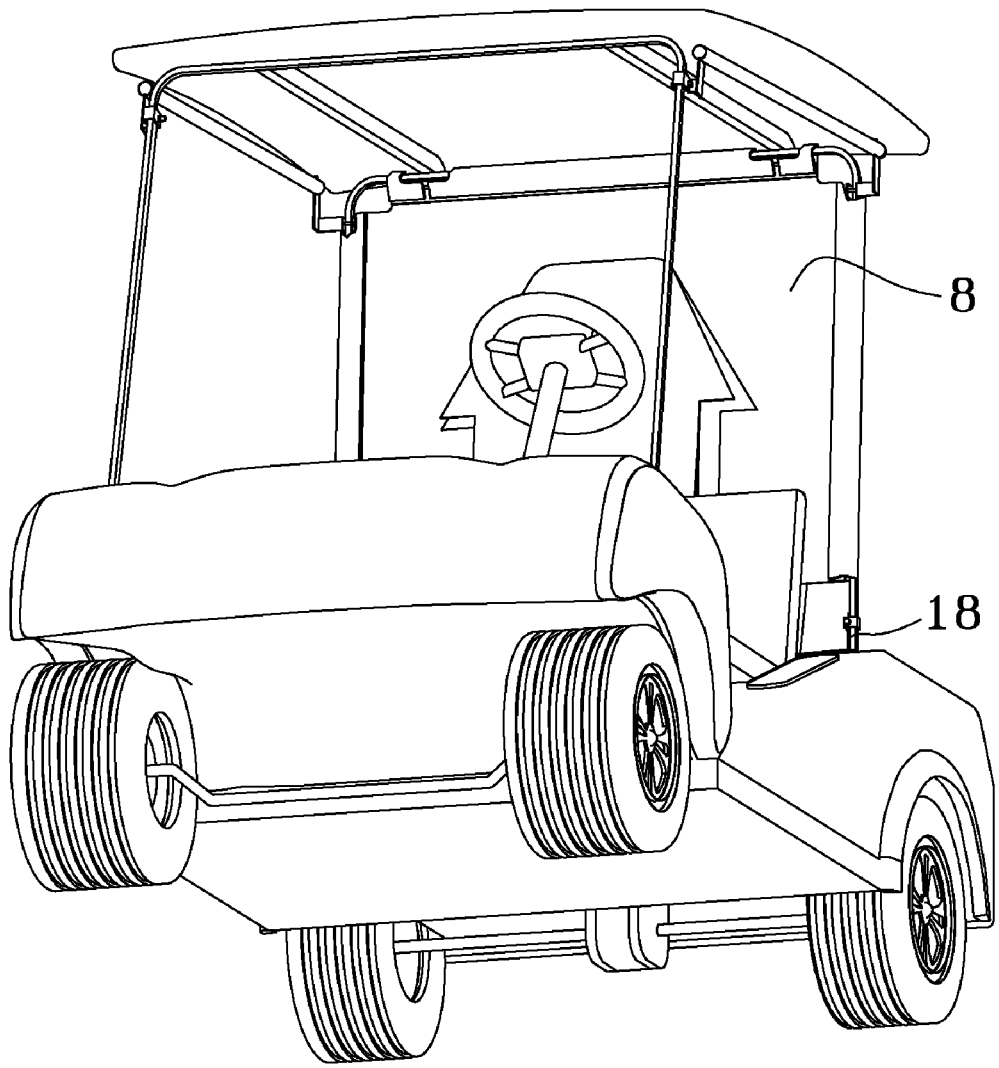
FIG. 5 is an exterior perspective front view showing the rear curtain and curtain support frame.
Figure 9:
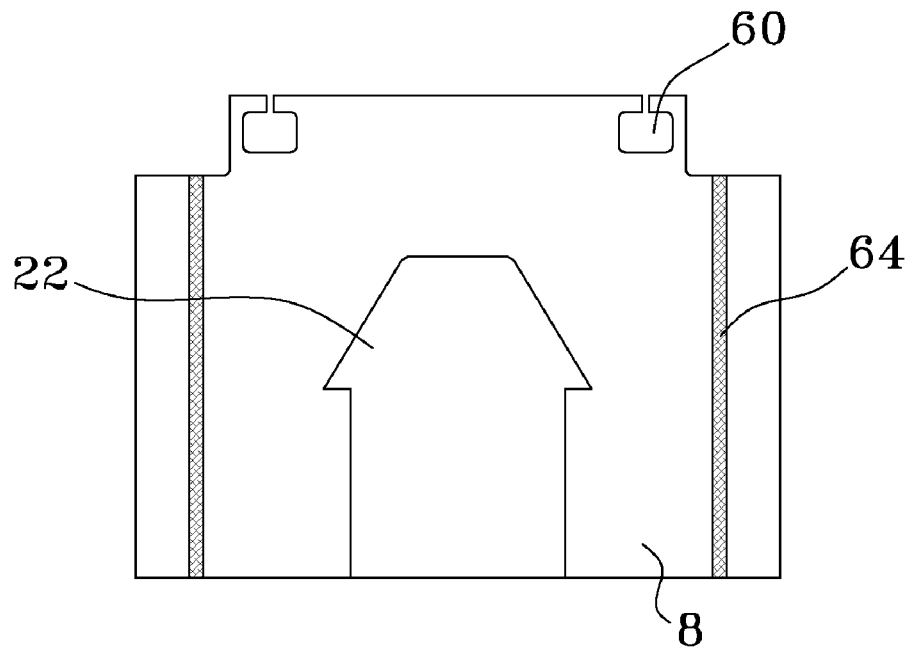
FIG. 9 is an inside view of the rear curtain.
Figure 10:
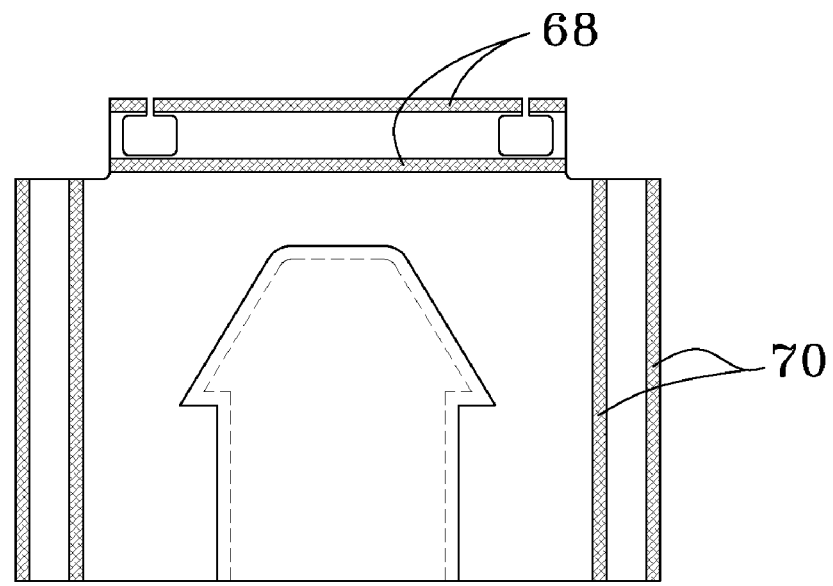
FIG. 10 is an outside view of the rear curtain.
Figures 11, 12:
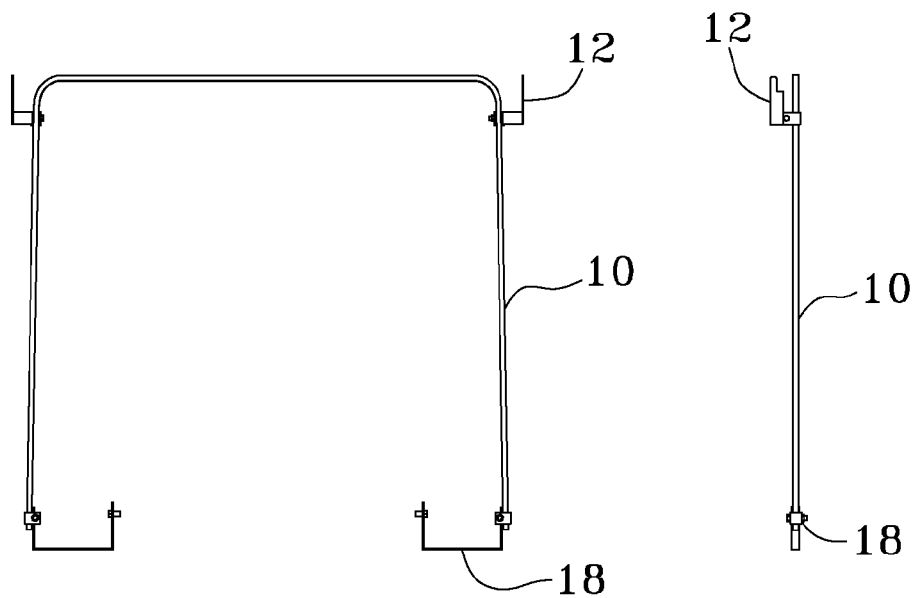
FIG. 11 is a front view of the rear curtain support frame and attachment arm and side curtain rod support bracket.
FIG. 12 is a side view of the rear curtain support frame.
Figures 13, 14:
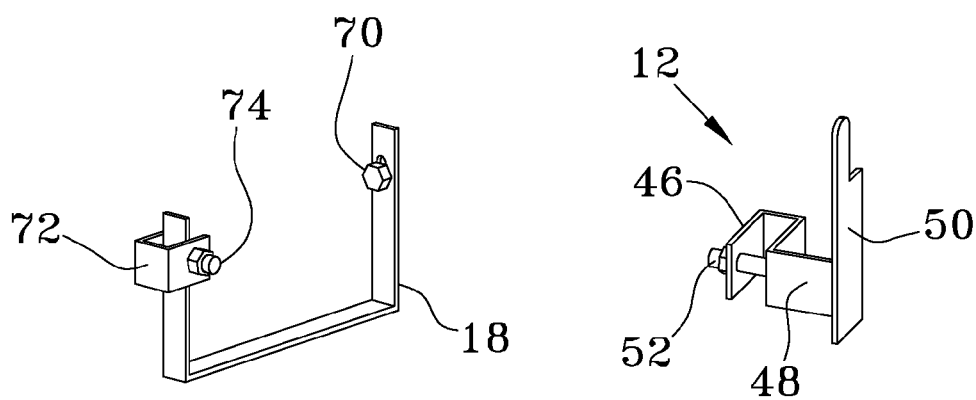
FIG. 13 perspective view of the rear curtain support frame attachment arm.
FIG. 14 is a side perspective view of the side curtain rod support bracket.

FIGS. 9 and 10 illustrate the outside and inside of rear curtain 8. Similar to the side curtains, the rear curtain has a central window 22 and is made of a waterproof flexible cloth with the peripheral edges 34 stitch hemmed back onto the body of the curtain. (These are not visible because of the placement of the strip hook and loop fasteners detailed below.) The top edge of the rear curtain has two cutaway sections 60 to accommodate the rear roof stanchions 62 as can be seen in FIG. 2. The inside of the rear curtain (FIG. 9) has a pair of side curtain attachment strips 64 that form the mating half of a hook and loop fastening system that attaches to the rear curtain attachment strips 66 located on the rear edge of the side rear curtain 6. (FIG. 8) When the rear curtain 8 is installed it may be connected to the side rear curtain 6 to better enclose the golf cart 2.

The outside of the rear curtain (FIG. 10) has a matingly engageable pair of rear curtain top support frame attachment strips 68 that allow the top edge of the rear curtain 8 to wrap around the rear curtain support frame 10 and be releaseably attached. Similarly there is a matingly engageable pair of rear curtain side support frame attachment strips 70 on either side of the outside of the rear curtain 8 that allow the side edges of the rear curtain 8 to wrap around the rear curtain support frame 10 and be releaseably attached.

FIGS. 11, 12, 13, and 15 illustrate the hardware necessary to mount the adjustable rear curtain support frame 10 onto the golf cart. The rear curtain support frame 10 is a hollow tubing assembly conformed to the shape of an inverted "U" having two ends that are height adjustably mounted in a vertical orientation to a golf cart 2 by frictional engagement with a pair of adjustable rear curtain support frame attachment arms 18 adjacent its ends. For additional strength and to reduce movement, the top of the rear curtain support frame 10 is connected to the golf cart roof supports by at least one rear curtain support frame roof clip 20. The rear curtain support frame attachment arms 18 are generally "U" shaped metal brackets with a bolt 70 passing through an orifice adjacent to a distal end thereof that threadingly engages an existing threaded recess on the golf cart rear roof stanchions 62. The proximate end of the rear curtain support frame attachment arms 18 has a frictionally adjustable enclosure 72 adapted to receive and frictionally constrain the ends of the rear curtain support frame 10. The frictionally adjustable enclosure 72 utilizes a simple mechanical fastener 74 to draw its parallel faces together to grip the outer surface of the rear curtain support frame 10 so as to allow for the support frame 10 to be adjusted vertically to the cart 2. In a similar fashion to the curtain rod support brackets 12, the rear curtain support frame roof clip 20 frictionally engages the outside of the top section of the support frame 10. The roof clip has a "G" configuration wherein there is an orifice formed through the top section 74 that allows the clip 20 to be bolted to the golf cart's roof stanchions or roof attachment members at one of the existing connection points.

FIG. 18 shows how the entire golf cart side curtain assembly is attached to the golf cart 2. The front curtain rod support brackets 12 are placed and frictionally engaged about the golf cart roof front stanchion adjacent the golf cart roof such that the curtain rod support plate 50 resides either inside the compartment of the golf cart or under the roof. The rear curtain rod supports 12 are similarly affixed to the remaining golf cart roof stanchions or the rear curtain support frame 10 at the approximate elevation of the front curtain rod support brackets 12. The curtain rod 14 is extended and feed through all of the curtain rings 40 of the side rear curtain 6 and then fed through the pocket of the side front curtain 4. The curtain rod/curtain assembly is lifted and the curtain rod support plate 50 is inserted through oblong orifices with their bushings so as to constrain and support the curtain rod 14 at their distal and proximate ends. Theoretically this should leave the curtain rod 14 residing parallel to the ground and/or the roof of the golf cart. The side rear curtain 6 may now be slid to the rear of the golf cart 2 to allow the passengers to exit.

If a rear curtain 8 is needed, three of its edges are wrapped around the rear curtain support frame 18 and the strips of hook and loop fasteners engaged to pull the rear curtain 10 taut. Lastly the rear curtain 8 is similarly affixed to the side rear curtain 6.

The use of the golf cart side curtain assembly is universal for all golf carts despite the dimensions between the golf cart pillars, because of its telescoping curtain rod 14, the overlapping side curtain design and the height adjustable rear curtain support frame 10 in conjunction with the adjustable connection devices.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. An improved golf cart curtain assembly comprising:
   at least one side front curtain;
   at least one side rear curtain;
   at least one side curtain rod;
   at least two curtain rod support brackets;
   a rear curtain;
   a rear curtain support frame;
   at least one adjustable rear curtain support frame attachment arm;
   at least one rear curtain support frame roof clip; and
   at least one side curtain extendable frame attachment clip;
   wherein said side curtains are slideably mounted on said curtain rod which is affixed to said golf cart by a pair of curtain rod support brackets, and wherein said rear curtain which is affixed about said rear curtain support frame is attached to said golf cart by a pair of said adjustable rear curtain support frame attachment arms and at least one rear curtain support frame roof clip, and wherein said side curtains are affixed to said golf cart by at least one side curtain extendable frame attachment clip, and wherein said front side curtain is a first planar sheet of flexible fabric that further comprises a longitudinal pocket sewn along an upper peripheral edge to accommodate sliding engagement about said curtain rod, at least one hook and loop fastening strap affixed to a front side edge adapted for engagement about a golf cart roof stanchion of said golf cart and at least one first grommet adjacent a bottom edge adapted for the connection of said side curtain extendable frame attachment clip to said front side curtain, and wherein said rear side curtain is a second planar sheet of flexible fabric that further comprises a series of curtain ring retention means affixed adjacent an upper edge of said rear side curtain that constrain a series of curtain rings sized to accommodate sliding engagement with said curtain rod, and wherein said rear side curtain has a hook and loop fastener first strip affixed adjacent a rear side edge for engagement with its matingly engageable hook and loop fastener second strip affixed adjacent a side edge of said rear curtain and at least one second grommet adjacent said rear side edge adapted for the connection of said side curtain extendable frame attachment clip to said front side curtain, and wherein said curtain rod has a first linear axis and a distal end and a proximate end, each with an oblong orifice formed there through to accommodate a said curtain rod support bracket, said oblong orifice having a second linear axis that resides parallel to said first linear axis.

2. The improved golf cart curtain assembly of claim 1 wherein said curtain rod has a first inner rod slidingly engaged within a matingly conformed second, hollow outer rod so as to form a longitudinally telescoping curtain rod.

3. The improved golf cart curtain assembly of claim 2 wherein a first side curtain extendable frame attachment clip is affixed to a front edge of said rear side curtain for attachment to said front roof stanchion, and at least one second side curtain extendable frame attachment clip engaged through said first grommet for attachment to said golf cart frame and a third side curtain extendable frame attachment clip engaged through said second grommet for attachment to said golf cart frame.

4. The improved golf cart curtain assembly of claim 3 wherein said curtain rod support brackets are generally "U" shaped friction clamps with a spacer arm extending normally therefrom, said spacer arm having a first linear axis and supporting an affixed planar curtain rod support plate having a second linear axis extending perpendicular to said first linear axis of said spacer arm, so that said support plate resides in a vertical orientation when said friction clamps reside in a horizontal orientation, and wherein said curtain rod support brackets are sized for frictional engagement about a said golf cart roof stanchion or a rear curtain support frame.

5. The golf cart side curtain assembly of claim 4 further comprising at least two polymer bushings sized to frictionally fit around an inner perimeter of said oblong orifices.

6. The golf cart side curtain assembly of claim 5 wherein said rear curtain support frame is hollow tubing conformed to the shape of an inverted "U" having two ends that are height adjustably mounted to a golf cart by frictional engagement with a pair of said adjustable rear curtain support frame attachment arms, said attachment arms comprising a generally "U" shaped metal bracket with a bolt passing through an orifice adjacent to a distal end thereof and threadingly engaging a threaded recess on said golf cart, and a frictionally adjustable open ended enclosure adapted to receive said support frame ends.

7. The golf cart side curtain assembly of claim 6 wherein said rear curtain support frame roof clip is a "C" shaped friction clamp adapted to frictionally engage about the exterior of said rear curtain support frame and that has a mounting tab extending therefrom with a orifice therethrough for the attachment of a mechanical fastener to a roof or roof support member of said golf cart.

8. The golf cart side curtain assembly of claim 7 wherein said rear curtain is a third planar sheet of flexible fabric having a first side, a second side, a top edge and two side edges, wherein said first side has a hook and loop fastener second strip affixed adjacent said first and second side edges for engagement with its matingly engageable hook and loop fastener first strip affixed on said side edges of said rear side curtain, and wherein on said second side, adjacent to each said top edge and side edge are sewingly affixed two matingly engageable, parallel hook and loop fastener strips adapted for the attachment of said rear curtain about said rear curtain support frame.

9. The golf cart side curtain assembly of claim 8 further comprising a clear fabric window affixed about a peripheral edge of a first cutout section of said front side curtain, a clear fabric window affixed about a peripheral edge of a second cutout section of said rear side curtain and a clear fabric window affixed about a peripheral edge of a third cutout section of said rear curtain.

10. The golf cart side curtain assembly of claim 9 wherein said tope edge of said rear curtain has two cutout portions adapted to allow the passage of a pair of golf cart roof rear stanchions.

* * * * *